Dec. 12, 1933.   M. BEREK   1,939,098
LIGHT INTENSIVE OBJECTIVE
Filed Aug. 17, 1932
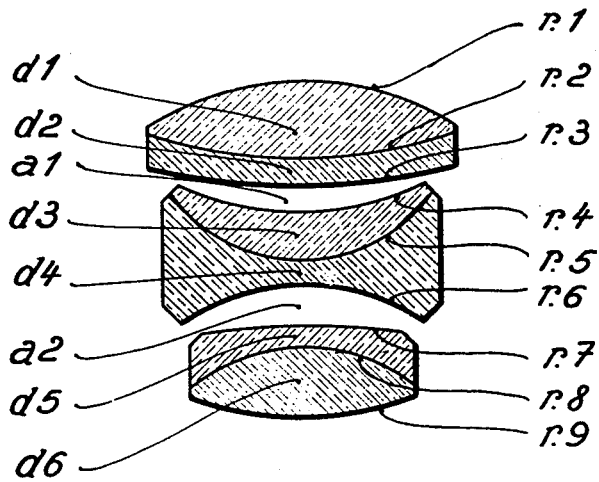
INVENTOR
Max Berek
BY
ATTORNEY Patented Dec. 12, 1933

1,939,098

UNITED STATES PATENT OFFICE 1,939,098

LIGHT INTENSIVE OBJECTIVE

Max Berek, Wetzlar, Germany, assignor to Ernst Leitz, Optische Werke, G. m. b. H., Wetzlar, Germany Application August 17, 1932, Serial No. 629,155, and in Germany June 6, 1931

1 Claim. (Cl. 88—57)

This invention relates to improvements in objectives with high light intensity.

The known objectives of this type by means of a triplet construction having only six faces exposed to the air allow with great light intensity the production of an anastigmatically level picture field free of coma and traces of relatively large extent.

However, these objectives are limited to the employ of a specific grade of glass.

It is the object of the present invention to avoid these limitations by making the $\nu$ value of the negative constituent in the central member larger than the $\nu$ value of the positive constituent of the central member and simultaneously at least great as the $\nu$ value of the negative constituent in the rear member, while as previously the absolute amount of $$\frac{n'-n}{r} \cdot f$$

at the cement face of the central member is smaller than 0,05, or furthermore, that the cement face in the central member is aggregating and the $\nu$ value of the negative constituent in the central member is smaller than the $\nu$ value of the positive constituent of the front member.

By keeping within these characteristics the field of selecting a durable glass from any of the suitable kinds of glass on the market is greatly enlarged, while the known constructions permit only the use of a specially fitted grade of glass to obtain a good anastigmatic correction free of coma and traces with great light intensity over a large picture angle.

These and other objects of my invention will become more fully known as the description proceeds and will then be specifically defined in the appended claims.

In the accompanying drawing forming a material part of this disclosure:

The single figure illustrates the preferred form of construction of an objective according to my invention.

As one example of the practical embodiment of my invention I cite the following with the use of an objective with a relative opening of 1:2,0 for $f=100$ mn:

$n_D$ and $\nu$ $r_1=+\ 52,4$
$r_2=-\ 85,5$
$r_3=-119,8$
$r_4=-\ 53,9$
$r_5=-\ 29,6$
$r_6=+\ 40,0$
$r_7=+137,0$
$r_8=+\ 33,3$
$r_9=-\ 67,7$ $d_1-15,5$  1,624/58,2
$d_2-\ 5,0$  1,603/38,0
$a_1-\ 4,9$
$d_3-\ 9,0$  1,665/35,7
$d_4-\ 5,0$  1,581/40,8
$a_2-\ 7,5$
$d_5-\ 4,0$  1,603/38,0
$d_6-13,0$  1,656/51,4

It will be understood that I have described the preferred form of objective only as an example of the many possible ways to practically construct the same and that I may make such changes therein as come within the scope of the appended claims without departure from the spirit of my invention and the principles involved.

Having thus described my invention what I claim as new and desire to secure by Letters Patent is:

An objective of great light intensity comprising two positive outer members and one negative central member each of said three members having one cement face, the cement face of at least the central and the rear member acting collective, while the absolute value of $$\frac{n'-n}{r} \cdot f$$

at the cement face of the frontal member is smaller than 0.05, if $n'-n$ represents the difference of the refraction numbers for $n_D, r$, the radius of curvature of the cement face and $f$ represents the focal distance of the entire system, with the $\nu$ value of the negative constituent of the central member larger than the $\nu$ value of the positive constituent of the central member, but smaller than the $\nu$ values in the positive constituents of the frontal member and characterized by equal $\nu$ values in the negative constituent of the central member and in the negative constituent of the rear member.

MAX BEREK.